United States Patent [19]

Silvergate et al.

[11] Patent Number: 5,231,461
[45] Date of Patent: Jul. 27, 1993

[54] SOLAR MONOCHROMATOR FOR FILTER CALIBRATION

[75] Inventors: Peter R. Silvergate, Monroe; Edward F. Zalewski, Sandy Hook, both of Conn.

[73] Assignee: Hughes Danbury Optical Systems, Inc., Danbury, Conn.

[21] Appl. No.: 805,244

[22] Filed: Dec. 9, 1991

[51] Int. Cl.⁵ ............................................. G01J 3/28
[52] U.S. Cl. ................................... 356/326; 356/328; 250/252.1
[58] Field of Search ............ 356/319, 326, 328, 416, 356/418, 419; 250/252.1 A

[56] References Cited

U.S. PATENT DOCUMENTS

| | | | |
|---|---|---|---|
| 3,864,037 | 2/1975 | Johnson | 356/418 |
| 4,678,332 | 7/1987 | Rock et al. | 356/328 |
| 4,969,740 | 11/1990 | Sonobe | 356/326 |
| 5,040,889 | 8/1991 | Keane | 356/328 |

FOREIGN PATENT DOCUMENTS 165022 9/1983 Japan ................... 356/319

OTHER PUBLICATIONS

Dandekar et al, *Applied Optics*, vol. 12, No. 4, Apr. 1973, pp. 825–831.

*Primary Examiner*—F. L. Evans
*Attorney, Agent, or Firm*—W. K. Denson-Low; R. A. Hays; M. W. Sales

[57] ABSTRACT

A method and system for calibrating color filters employed in polychromatic imaging of a subject includes a scanning mirror (28), telescope (30), filters (104), and a detector array (60) employed for both imaging and calibration processes. A bundle (44) of optical fibers is employed for producing a slit-shaped beam of solar rays which are collimated and applied to a diffraction grating plate (54) or prism (72) to produce a set of dispersed solar rays. The dispersion is based on color. In one position of the scanning mirror, rays from a subject (12) to provide an image are directed through the telescope and scanned across the filters (104) and detectors (102). In another position of the scanning mirror, the set of dispersed solar rays is scanned past the filters and the detectors. Imaging data outputted by the detectors is collected for producing an image (112) of the subject. Data of the dispersed rays is collected for calibrating the color filters. A stored reference color profile (92) of each filter is correlated with the calibration data (90) to obtain a set of correction terms which are employed for altering the image data to compensate for any drift in the color characteristics of the filters. A broad band detector detects Fraunhofer spectral lines to serve as a reference standard wavelength for alignment of the system.

26 Claims, 3 Drawing Sheets

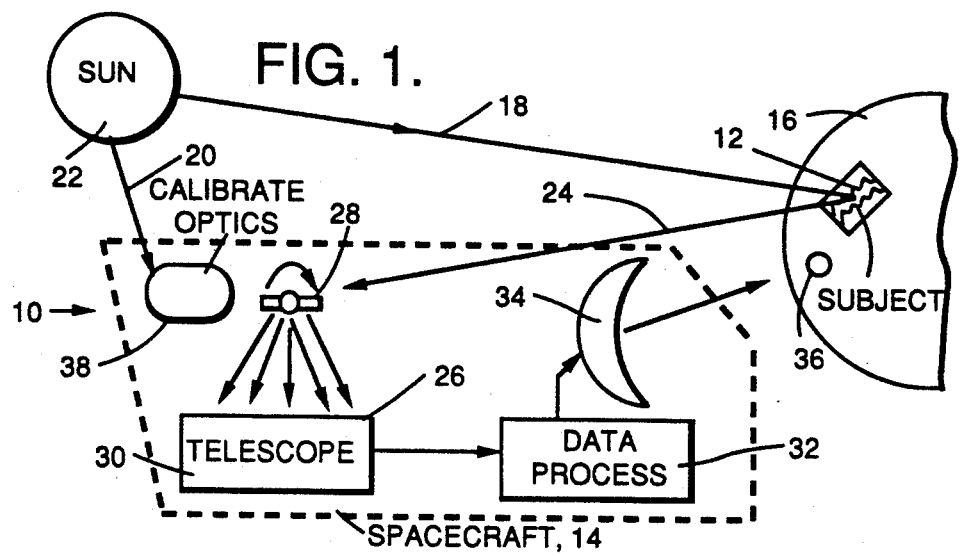
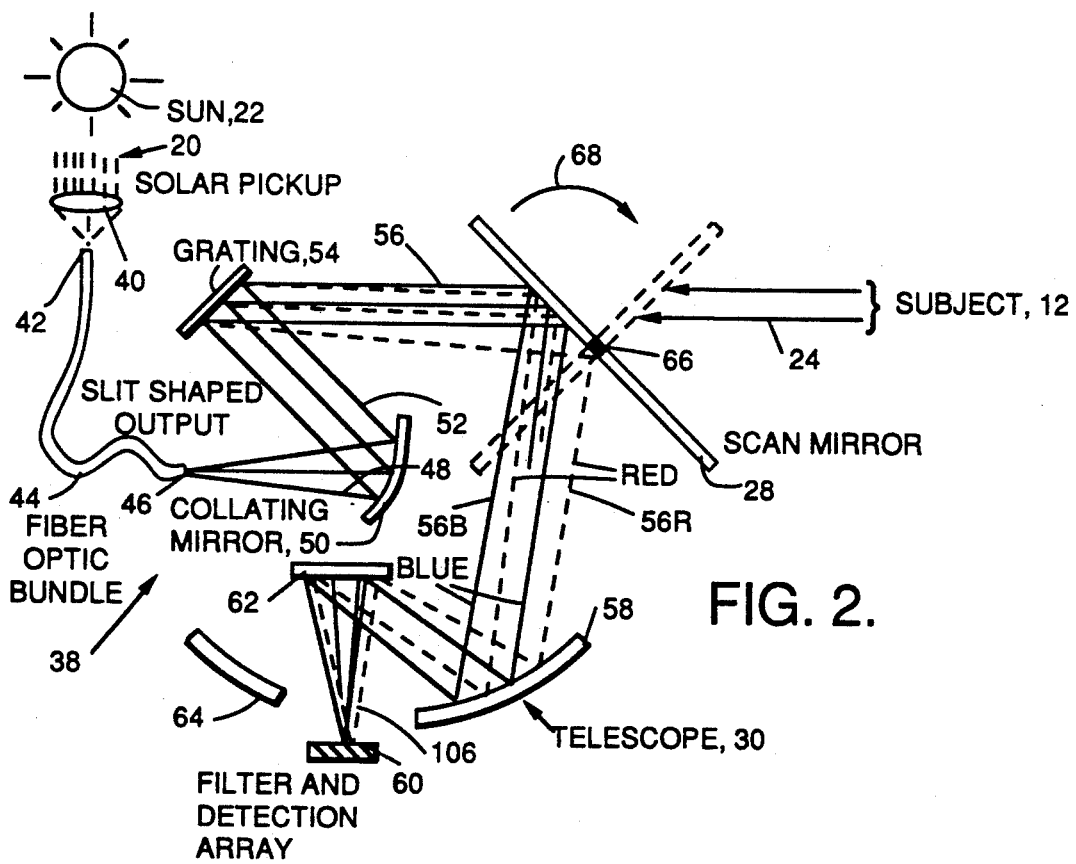

SOLAR MONOCHROMATOR FOR FILTER CALIBRATION

BACKGROUND OF THE INVENTION

This invention relates to an optical system and method for calibrating a set of filters forming a part of a space-borne imaging system employing a scanning mirror and, more particularly, to the resolution of solar radiation into the spectral colors, as by use of a prism or grating, and a scanning of the spectral colors by the scanning mirror past the filters to continually update color-transmissivity profiles of individual ones of the filters.

There is considerable interest in the use of spacecraft for photographing terrain of the earth, such as by use of an imaging system which views the terrain through a plurality of filters which identify spectral components, or colors, of various features in the terrain. For example, colored images of farmland can be used to identify crops which are suitably watered as compared to crop which may be suffering from a lack of water. The quality of data obtained from such a photographic survey of the earths terrain is dependent, in large measure, upon the quality of the color filters employed in the photographic system.

An aspect of color filters of considerable concern is the fact that their characteristics may vary in time. For example, a yellow filter which has high transmissivity to the color yellow while attenuating both orange and green colors might tend to drift during extended use upon a spacecraft such that the filter function may shift to allow passage of a significant amount of orange along with the yellow, or a significant amount of green along with the yellow. Such shifts in the filter function may be characterized by a shift in the frequency or wavelength at which a peak transmissivity occurs, or in a broadening of the peak, or by reduced attenuation of colors distant, in terms of spectral distribution, from the color of peak transmissivity. In any event, such a shift in the functions of one or more of the color filters must be known by scientists evaluating the photographic data obtained by the spacecraft and transmitted from the spacecraft back to a receiving station on the earth. Updated information of the filter functions permits scientists to compensate for shifts in the filter functions so as to enable an accurate interpretation of the photographic images. However, in the absence of some form of filter calibration during operation of the spacecraft, there may be a degradation of the accuracy of the color data due to aging of the filters with consequent changes in the color-attenuation profiles of the filters.

SUMMARY OF THE INVENTION

The aforementioned problem is overcome and other advantages are provided by an optical system for calibrating the color filters by use of existing optical equipment, particularly a scanning mirror, of the spacecraft-borne imaging system wherein, in accordance with the invention, the Fraunhofer spectral lines of solar radiation and the solar spectral continuum are scanned by the mirror to calibrate filters of the imaging system. In a preferred embodiment of the invention, the scanning mirror rotates about an axis to sweep successive portions of the earths terrain past a set of detectors wherein individual ones of the detectors are provided with filters for viewing reflected radiation from the terrain. The calibration system includes a fiber-optic bundle for receiving rays of light from the sun, an output end of the bundle being configured with individual fibers arranged in a line parallel to the mirror rotational axis so as to illuminate the mirror with an input slit of light. Prior to transmission of the slit of light to the mirror, the slit of light is collimated to provide a bundle of parallel rays of light which are then transmitted via a grating or prism to the mirror. The grating or prism serves to disperse the light into its component colors which are spaced apart from each other along a line perpendicular to the rotational axis of the mirror. Thereby, during each rotation of the mirror, the solar spectrum is swept past the set of detectors with their filters such that the frequency or wavelength of the spectral lines varies as a function of time during each sweep.

Transmissivity profile data, as a function of wavelength, for each of the filters is known initially, and is stored, prior to the use of the filters in the spacecraft-borne imaging system. A sampling of the filter outputs by means of the optical detectors provides an updated profile of each filter. The various spectral lines of emission and absorption of the suns rays are also known, and have been stored prior to the calibration process. By comparing the scanned spectral lines of the solar radiation with the stored spectrum, individual lines of the spectrum are recognized and serve as benchmarks for aligning the scanned solar spectrum with the stored spectrum. Thereby, irrespective of any drifting of the calibration optics, such as thermal expansion of the prism by way of example, is automatically compensated by use of the benchmarks. The relative amplitudes of data samples of light received through each of the filters as a function of wavelength are stored and compared with the originally stored filter profile data to determine if any drifting in the profile characteristics has occurred. Any shift in a filter profile characteristic is noted by this comparison, and is transmitted to the ground station along with the imaging data to allow scientists to correct the imaging data to compensate for the shift in the filter function. Thereby, accuracy of the photographic data is maintained independently of a shifting of the filter functions.

BRIEF DESCRIPTION OF THE DRAWING

The aforementioned aspects and other features of the invention are explained in the following description, taken in connection with the accompanying drawing wherein:

FIG. 1 shows a stylized view of an extraterrestrial imaging system including calibration of color filters by the system of the invention;

FIG. 2 is a detailed diagrammatic view of an optical portion of the calibration system providing for a dispersions of the suns rays;

DETAILED DESCRIPTION

Figure 7:
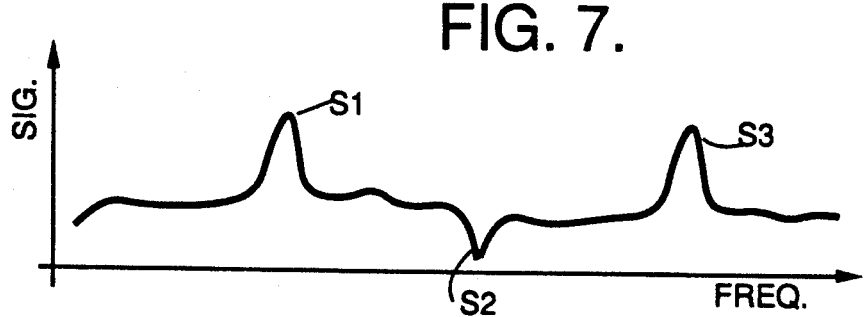
FIG. 7 is a graph showing a stylized representation of the scanned dispersed spectrum as viewed by a broadband detector.

FIG. 1 shows an imaging system 10 for gathering color data of a subject 12. Generally, such imaging systems employ some form of color filtering in order to obtain data as to the color composition of the subject. For example, the subject may be viewed by a bank of photodetectors which provide electrical signals in response to incident radiation. Selected ones of the photodetectors are provided with filters of various colors through which the selected photodetectors view the incident radiation. Thus, the integrity of the color data is related directly to the integrity of the color filters. Any drift in the color transmission characteristics, namely, radiation transmissivity as a function of wavelength or frequency, distorts the data describing coloration of the subject. Thus, the invention provides for a convenient real-time calibration of the filters by use of a completely dependable polychromatic radiation source, namely, the sun. Since such imaging system generally employs a scanning mirror for scanning reflected subject radiation past the bank of detectors, the preferred embodiment of the invention employs the scanning mirror of the imaging system to interleave calibration optical signals with optical signals from the subject, so as to enable the real-time calibration of the filters for a more accurate and reliable gathering of color data by the imaging system.

In FIG. 1, the imaging system 10 employs a spacecraft 14 which orbits the earth 16 and views the subject 12 which, by way of example, is a farm growing crops. It is noted that the sunlight which illuminates the subject farm provides light in various parts of the electromagnetic spectrum. For the purpose of demonstrating the imaging system and the invention, it is assumed that the light reflected from the subject farm is composed, similarly, of various colors, and that the color composition provides useful information of the quality of the crops growing on the subject farm. Therefore, a continuous calibration of the filters, in accordance with the invention, ensures accuracy of the crop data. While the preferred embodiment of the invention is being demonstrated by use of light in the visible region of the electromagnetic spectrum, it is to be understood that, in the practice of the invention, use of the term "light" herein includes also infrared and ultraviolet portions of the spectrum.

As shown in FIG. 1, rays 18 and 20 from the sun 22 illuminate, respectively, the earth 16 and the spacecraft 14. In particular, the rays 18 illuminate the subject 12 from which reflected rays 24 propagate towards the spacecraft 14. The spacecraft 14 carries imaging apparatus 26 which includes a scanning mirror 28, a telescope 30, data processing equipment 32, and an antenna 34 for transmitting imaging data from the data processing equipment 32 back to a receiving station 36 on the earth 16. Also carried by the spacecraft 14 is optical calibration equipment 38 which receives the incident solar rays 20 and converts these rays into a reference color spectrum to be employed by the imaging apparatus 26.

In accordance with a feature of the invention, the optical calibration equipment 38 cooperates with the scanning mirror 28 to present the calibration spectrum to the telescope 30 and to the data processing equipment 32 along with the imaging data of the subject 12, the imaging data being carried by the reflected rays 24. The reflected rays 24 are incident upon the scanning mirror 28, and are reflected by the scanning mirror 28 through the telescope 30 to be received by the data processing equipment 32. Thus, the imaging apparatus 26 processes both imaging data and calibration data so as to provide a continuous update of the color characteristics, or transmission profile, of various filters employed in the data processing equipment 32 as will be described hereinafter.

FIG. 2 shows details of the optical calibration equipment 38 which receives the rays 20 from the sun 22, and disperses the spectrum of the rays 20 so as to spatially separate the various colors of the solar spectrum In the calibration equipment 38, the rays 20 are received by a lens 40 which serves to gather the rays 20 over a relatively large area, and to direct the rays 20 in converging fashion on an input end 42 of a fiber optic bundle 44. The input end 42 and the central portion of the fiber optic bundle 44 have a circular cross section. However, at an output end 46 of the bundle 44, the optical fibers are rearranged to provide a cross section to the bundle 44 having the shape of an elongated narrow rectangle, thereby to output a beam 48 of light having the same configuration as a beam of light exiting from a narrow slit. The fiber optic bundle could also consist of tapered fibers at the input end 42 to further enhance the light collection efficiency of the fiber optic bundle.

The slit-shaped output beam 48 diverges with increasing distance from the bundle 44, and is collimated by a concave mirror 50 to produce a beam 52 of parallel rays. The beam 52 is incident upon a planar grating 54 having the form of a plate with closely spaced rulings which serve to disperse the incident beam 52 into a set of divergent beams 56 wherein each of the beams 56 has a different color. The divergent beams 56 are reflected by the scanning mirror 28 to a concave primary mirror 58 of the telescope 30. At the telescope 30, two of the divergent beams 56, namely a blue beam (solid lines) and a red beam (dashed lines) are identified. The primary mirror 58 focuses the rays of the divergent beams 56 to impinge upon a detector array 60 by means of a folded optical path wherein the folding is accomplished by a secondary mirror 62 of the telescope 30. The secondary mirror 62 is located in front of a central aperture 64 in the primary mirror 58, and the detector array 60 is located behind the central aperture 64. Rays of the beams 56 incident upon the concave primary mirror 58 are directed by the secondary mirror 62 through the central aperture 64 to impinge upon the detector array 60. The detector array 60, as will be described with reference to FIG. 4, includes a plurality of detectors and filters which are omitted in FIG. 2 so as to simplify the drawing.

In accordance with the invention, the reflected rays 24 from the subject 12 are reflected also from the scanning mirror 28 to impinge upon the telescope 30, and to be focused by the telescope 30 upon the detector array 60. The scanning mirror 28 rotates about an axis 66, perpendicular to the plane of the drawing, the rotation being, by way of example, clockwise as is indicated by the arrow 68. During the rotation of the scanning mirror 28, the position of the mirror 28 constantly changes. In the position of the mirror 28 as depicted in solid lines in FIG. 2, the dispersed rays from the grating 54 are reflected to the telescope 30. At a later position of the scan mirror 28, indicated in phantom view, the rays 24 from the subject 12 are reflected by the mirror 28 to the telescope 30. During the interval of time when the dispersed rays of the divergent beams 56 are incident upon the telescope 30, the rotational movement of the mirror 28 produces a scanning of the divergent beams 56 across the primary mirror 58. Similarly, during the interval of time when the subject rays 24 are directed by the mirror 28 to the telescope 30, the rotational movement of the mirror 28 provides for a scanning of the subject rays 24 across the primary mirror 58. Thereby, the optical calibration equipment 38 in conjunction with the scanning mirror 28 of the imaging apparatus 26 provide for an alternate scanning of dispersed collimating rays of different colors, and the subject rays 24 across the primary mirror 58. With the clockwise direction of rotation of the mirror 28, as depicted in FIG. 2, the scanned beams move from right to left across the primary mirror 58. A similar translatory motion in the same direction, from right to left, occurs at a detector array 60 wherein beams of light having various colors of the rainbow move sequentially across the detector array 60. An image of the subject 12 also translates, from right to left, across the detector array 60 with passings of the dispersed rays alternating with passings of the subject image across the detector array 60.

Figure 3:
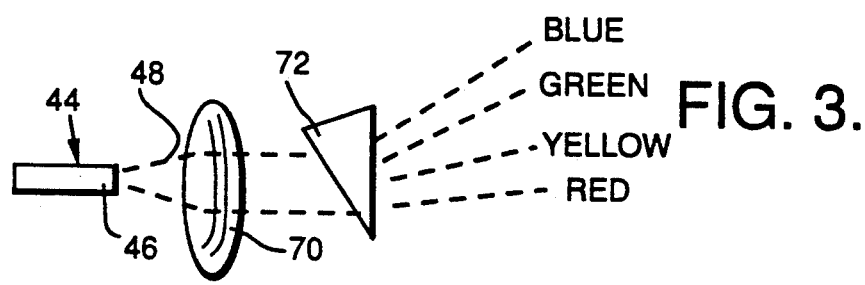
FIG. 3 is an alternative embodiment of a portion of the optical system of FIG. 2.

FIG. 3 shows an alternate construction of the portion of the optical calibration equipment 38 wherein the beam 48, outputted from the fiber optical bundle 44, is dispersed. In FIG. 2, the dispersion is produced with the aid of the collimating mirror 50 and the ruled grating 54. In FIG. 3, the collimating function is provided by a convex lens 70, and the dispersion is accomplished by means of a prism 72. The rays outputted from the fiber optic bundle 44 propagate towards the lens 70 which collimates the rays and directs the rays towards the prism 72. The collimated rays impinging upon the prism 72 propagate through the prism to be diffracted into a plurality of diverging beams having the various colors of the rainbow. By way of example in FIG. 3, four of the colors, red, yellow, green and blue, are identified.

Figure 4:
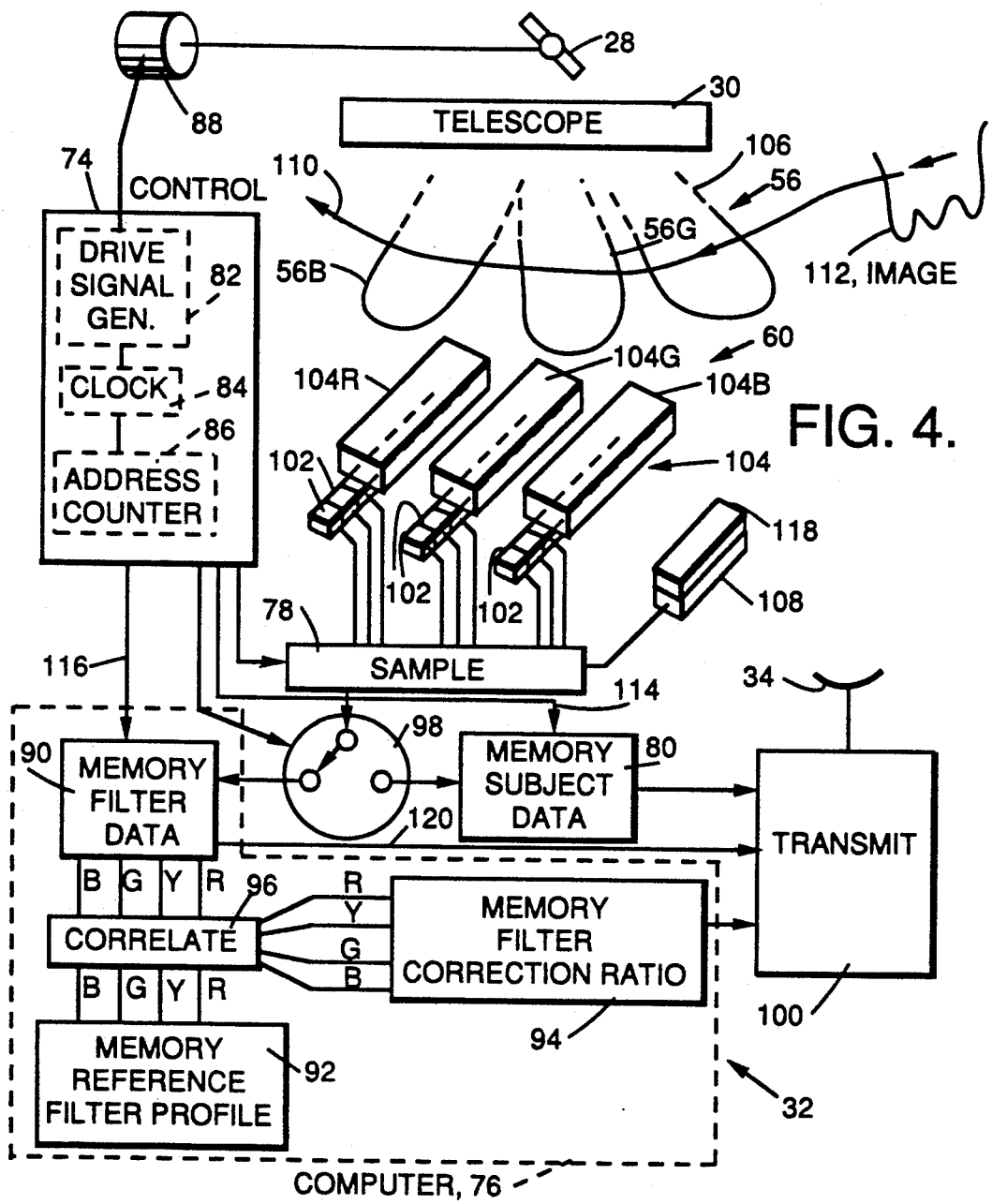
FIG. 4 is a block diagram showing combined operation of the calibration system of the invention in conjunction with the development of an image of a subject.

FIG. 4 shows further details in the construction of the data processing equipment 32 which enable processing of both calibration and imaging signals. The data processing equipment 32 comprises a controller 74, a computer 76, a sampling unit 78, and a memory 80. The controller 74 includes a drive-signal generator 82, a clock 84, and an address counter 86. The scanning mirror 28 is rotated by a motor 88, the motor 88 being activated by drive signals provided by the generator 82. The clock 84 applies clock pulses to both the generator 82 and the counter 86 for synchronizing their operations. The computer 76 comprises three memories 90, 92, and 94, and a correlator 96. The switch 98 couples output signals of the sampling unit 78 to both the memories 80 and 90, the switching being operative in response to signals of the controller 74 for applying signals of the sampling unit 78 to either the memory 80 or the memory 90. Data stored within the memories 80 and 94 are applied to a transmitter 100 for transmission via the antenna 34 to the receiving station 36 (FIG. 1).

By way of example in the construction of the detector array 60, the array 60 comprises a plurality of detectors 102 arranged in rows and columns to provide a two dimensional image of the subject 12. There is one row of the detectors 102 for each color of interest By way of example, three rows of the detectors 102 are shown in FIG. 4 for evaluating data in the red, green, and blue components of the optical spectrum radiated from the subject 12 via the reflected rays 24 (FIG. 1). A separate optical filter is provided for each of the rows, FIG. 4 showing three optical filters 104 of three different colors, namely, red,(R), green (G), and blue (B). The filters 104 are placed alongside the respective rows of the detectors 102, and are located between the detectors 102 and the telescope 30 so that rays 106 (FIGS. 2 and 4) of light outputted by the telescope 30 to the detector array 60 propagate through the filters 104 followed by subsequent detection of the rays 106 by the detectors 102 of the respective rows. An additional reference detector 108 is provided in the array 60 for detecting the rays 106 via a wide band filter 118, as will be described hereinafter. Thereby, the reference detector 108 detects light throughout a large portion of the spectrum of the rays 106. The sampling unit 78 connects with the reference detector 108 and all of the detectors 102 for sampling photocurrent outputted by the detector 108 and the detectors 102 in response to their illumination by the rays 106.

Figure 5:
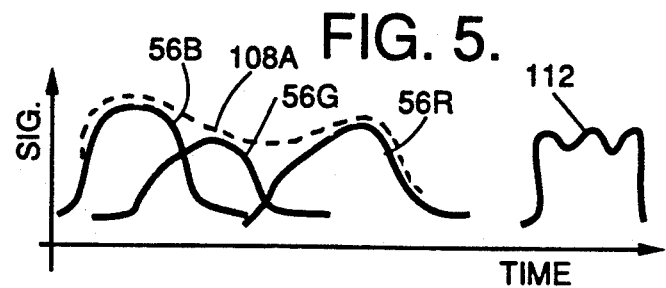
FIG. 5 is a graph showing a set of traces of the color transmissivity profiles of a set of filters of FIG. 4 as the filters are swept sequentially by dispersed rays of the sun.

In operation, the divergent beams 56 (FIG. 2) produced by the grating 54 are swept by the scanning mirror across the primary mirror 58 of the telescope 30, wherein two of the beams, namely, the blue beam 56B and the red beam 56R are indicated in FIG. 2. The beams 56 propagate through the telescope 30 to be imaged via rays 106 upon the detector array 60, three of the beams, namely, the blue beam 56B, the green beam 56G and the red beam 56R being shown in FIG. 4 by way of example. An arrow 110 indicates the sweeping, or scanning, of the beams 56 across the array 60 by rotation of the scanning mirror 28. Interleaved between successive scans of the set of beams 56 are successive scans of the image 112 of the subject 12 as indicated in FIGS. 4 and 5. FIG. 5 shows a sequence, as viewed by the reference detector 108, of a blue beam 56B followed by a green beam 56G and then by a red beam 56R and, at a later time in the scan, by the image 112 of the subject 12.

In FIG. 4, the sampling unit 78, the switch 98 and the mirror 28 are driven in synchronism by the controller 74. Addressing of the memory 80 is provided by address signals from the controller 74 along line 114. As the image 112 approaches the array 60, the switch 98 is operated by the controller 74 to connect the output terminal of the sampling unit 78 to the memory 80 for storage of image data. As the image 112 begins to pass by the array 60 from right to left, the reference detector 108 receives broadband image data which is sampled by the sampling unit 78 and outputted as a sequence of samples to the memory 80. As the image 112 progresses across the array 60, the detectors 102 behind the red filter 104B begin to receive rays from the image 112 and to output signals which are sampled by the sampling unit 78, and are dispatched from the sampling unit 78 via the switch 98 to the memory 80. With progression of the scan of the image 112, the detectors 102 behind the green filter 104G and, later, the detectors 108 behind the red filter 104R output signals which are sampled by the sampling unit 78 and are applied to the memory 80. When the image 112 is centered on the array 60, all of the detectors 102 are outputting data to be stored in the memory 80, the outputting of data continuing until passage of the image 112 past the array 60. Thereby, the memory 80 stores a frame of data of the image 112, including both broadband data and data in various spectral bands, for subsequent transfer via the transmitter 100 and the antenna 34 to the receiving station 36.

Upon approach of the set of beams 56 to the array 60, the switch 98 is operated by the controller 74 to connect the output terminal of the sampling unit 78 to an input terminal of the memory 90. Addressing of the memory 90 and other operations of the computer 76 are synchronized with the sampling of the sampling unit 78 via timing and address signals from the controller 74 via line 116 to the computer 76. As the set of beams 56 sweeps past the array 60, data of the beams 56 is gathered and stored in the memory 90 in the same fashion as described above for the gathering of data of the image 112. As shown in FIG. 5, as the blue beam 56B passes the blue filter 104B, a profile of the transmissivity of the blue filter 104B is obtained. Similarly, as the green and the red beams 56G and 56R pass their respective filters 104G and 104R, there are obtained profiles for the transmissivities of the filters 104G and 104R.

Thus broadband data of the colors is obtained via the reference detector 108, and data of specific colors is obtained from the detectors 102 behind the various filters 104. However, the spectral data of the sun's spectrum is known from a previous calibration of the filters 104, and is stored in the memory 92. The correlator 96 correlates the actual spectral data of the memory 90 with the reference spectral data of the memory 92 to output differences in the data in the form of filter correction terms, or ratios of measured intensity to reference intensity, which are stored in the memory 94. The correction terms are communicated to the receiving station 36 via the transmitter 100 and the antenna 34 along with the image data to enable the color data of the image to be corrected for variations in characteristics of the filters 104 by use of the correction ratios.

Figure 6:
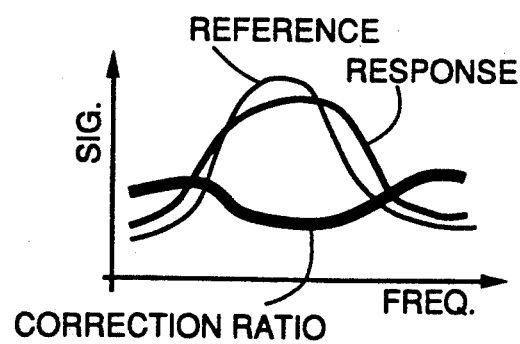
FIG. 6 is a graph showing the actual spectral response of a filter of FIG. 4 in comparison with a reference filter response for development of a correction signal.

The spectral calibration data in the memory 90 is stored as a function of time, this being proportional to the angle of rotation of the mirror 28, and to an increment or decrement in the frequency of the radiation. The increment or decrement in the frequency depends on the sense of the rotation of the mirror 28. For example, as shown in FIG. 4, the input calibration spectrum is swept past the array 60 from blue to red, this being a decrement in frequency and an increment in wavelength. The signal strength received at a detector 102 as a function of time represents the transmissivity of a filter 104, and is plotted in FIG. 6 as a solid trace for the filter response or profile. The corresponding reference filter profile, stored in the memory 92, is shown in FIG. 6 as a dashed line. The computer 76 divides signal values of the response profile by corresponding signal values of the reference profile to obtain a correction ratio which is used to correct the color data of the image 112. The two-dimensional arrangement of the detectors 102 in the array 60 provides for a two-dimensional presentation of pixels of the image data. Each pixel includes color data in addition to amplitude data, the latter being obtained by summing together the responses of the various color components. The color data of each color component is corrected for each pixel by use of the color correction ratio. The ratio indicates how the response has shifted from its correct value. Dividing the pixel color component data by the correction ratio for each color restores accuracy to the image so as to counteract any drift or aging in the filter characteristics.

For optimum accuracy, there are stored within the reference filter-profile memory 92 also the anticipated solar spectrum including various Fraunhofer spectral lines. The presence of these lines in the received spectrum is readily identified by the reference detector 108 which provides solar intensity data as a function of radiation frequency as the dispersed beams 56 of color are swept past the detector 108 by the rotating mirror 28. The response of the reference detector 108 is shown in stylized form in the graph of FIG. 7 wherein one or more of a set of specific spectral lines S1, S2 and S3 serve as benchmarks to indicate readily identifiable intensity peaks and valleys of the solar spectrum. By correlating the received spectrum of FIG. 7 with a corresponding reference spectrum stored in the memory 92, the computer 76 aligns the position of the set of beams 56 with the true value of the radiation frequency, and thereby compensates for any errors which might occur by mechanical misalignment of the mirror 28 and the grating 54 due to thermal expansion, by way of example.

In the use of the detector 108, it is advantageous to provide a broad band filter 118 in front of the detector 108 so that the detector 108 views only that light falling within the passband of the filter 118. The intensity of the radiation detected by the detector 108 via the filter 118 is presented in FIG. 5 by a dashed line 108A which shows the spectral contributions to be equal to the contributions of the spectral portions of the beams 56B, 56G and 56R. A suitable filter in the visible portion of the spectrum has a passband in the rang of 400–500 nanometers, this frequency range providing a plurality of useful lines in the Fraunhofer spectrum to serve as the foregoing benchmarks. As is well-known in the use of gratings, such as the grating 54 of FIG. 2, higher order diffractions of radiation are possible for radiations having a wavelength larger by an integral multiple, such as two or three for example, than the wavelength of the first order radiation. Higher orders of diffracted radiation are also directed by the scanning mirror 28 toward the detector 108. The diffracted radiation described above with reference to FIG. 2 is understood, by way of example, to be the third order diffraction. The filter 118 attenuates the lower and the higher-order diffracted radiation from impinging upon the detector 108, thereby to insure that there is no interference by lower and higher-order diffracted radiation in the foregoing alignment of the position of the set of beams 56 with the true value of the radiation frequency.

In the use of spacecraft for gathering imaging data, it is a practice to transmit raw data to the receiving station 36 (FIG. 1) on the earth This can be accomplished, as shown in FIG. 4, by outputting data from the memory 90 directly via line 120 to the transmitter 100 for transmission via the antenna 34 to the receiving station 36. Also, with all of the raw data provided to the receiving station 36, if desired, the memories 92 and 94 plus the correlator 96 may be located at the receiving station 36 for performing the foregoing mathematical operations for the filter correction ratios, instead of in the data processor 32 of the spacecraft 14 For practicing the invention, these mathematical operations may be performed either in the spacecraft 14 or at the receiving station 36.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A filter calibration system comprising:

slit means for producing a slit-shaped beam of solar rays;

means for dispersing said beam of solar rays into a set of dispersed rays angled relative to each other as a function of color;

scanning means, and radiation detection means for detecting incident radiation propagating along a path from said scanning means to said detection means;

telescope focusing means for focusing said incident radiation upon said detection means;

filter means disposed along said path to provide data via said detection means as to color of said incident radiation; and wherein said scanning means scans said set of dispersed rays past said filter means and said detection means, said detection means outputting data during a scan of said scanning means as a color profile of a color transmissivity of said filter means versus radiation wavelength.

2. A system according to claim 1 wherein said detection means includes means for sensing a Fraunhofer line of the color spectrum to serve as a wavelength reference for said calibration system.

3. A system according to claim 1 wherein said detection means comprises an array of detectors and said filter means comprises an array of filters having different spectral pass-bands for transmission of radiation to said array of detectors.

4. A system according to claim 3 wherein a separate one of said detectors is optically coupled to each of said filters.

5. A system according to claim 4 further comprising means for storing data outputted by each of said detectors, and means for synchronizing operation of said storing means with said scanning means to correlate said data.

6. A system according to claim 1 wherein said slit means comprises a bundle of optical fibers, an output end of said bundle being arranged in the form of a slit.

7. A system according to claim 6 wherein said slit means further comprises means for collimating rays of radiation outputted from said bundle of optical fibers to provide said slit-shaped beam of solar rays.

8. A system according to claim 7 wherein said dispersing means comprises an optical grating.

9. A system according to claim 7 wherein said dispersing means comprises a prism.

10. A system according to claim 7 wherein said collimating means comprises a lens.

11. A system according to claim 7 wherein said collimating means comprises a mirror.

12. A system according to claim 1 wherein said scanning means comprises a mirror rotatable about an axis parallel to a slit-shaped cross-section of said slit-shaped beam.

13. A composite imaging and filter calibration system comprising:

slit means for producing a slit-shaped beam of solar rays;

means for dispersing said beam of solar rays into a set of rays dispersed according to color;

scanning means, and radiation detection means for detecting incident radiation propagating along a path from said scanning means to said detection means;

filter means disposed along said path to provide data via said detection means as to color of said incident radiation; and wherein said scanning means scans imaging radiation from a source of image data and said set of dispersed rays past said filter means and said detection means, said detection means outputting image data and calibration data during a scan of said scanning means, said image data including color of a subject, and said calibration data including color transmissivity of said filter means as a function of radiation wavelength.

14. A system according to claim 13 wherein said scanning means separates said image data from said calibration data.

15. A system according to claim 13 wherein said scanning means scans said imaging radiation past said filter means at a time different from a time of scanning of said dispersed rays past said filter means to permit extraction of said image data from said detection means separately from an extraction of said calibration data from said detection means.

16. A system according to claim 15 wherein said scanning means scans alternately said imaging radiation and said dispersed rays past said filter means.

17. A system according to claim 13 further comprising means coupled to said detection means for transmitting said image data to a site remote from said composite system.

18. A system according to claim 17 wherein said detection means includes means for selectively switching said imaging data and said calibration data to said transmission means for transmission to said remote site.

19. A system according to claim 18 wherein said detection means includes storing means coupled to output ports of said switching means for storing said imaging data and said calibration data.

20. A system according to claim 13 wherein said detection means includes switching means, and a first memory means and a second memory means coupled to output ports of said switching means, said switching means selectively switching said imaging data and said calibration data to said first memory means and to said second memory means.

21. A system according to claim 20 wherein said filter means comprises an array of filters having different spectral pass-bands for transmission of radiation to said detection means, and said detection means includes an array of detectors, and sampling means coupled between an input port of said switching means and said array of detectors for providing samples of said imaging and said calibration data to said first and to said second memory means.

22. A system according to claim 4 further comprising a third memory means storing reference filter color transmissivity data as a function of radiation wavelength, and a comparator for comparing data of said second and said third memory means to output filter correction terms for correction of said imaging data.

23. A system according to claim 22 further comprising means coupled to said detection means for transmitting said filter correction terms from said third memory means to said remote site.

24. A system according to claim 20 further comprising means for synchronizing operation of said scanning means with said switching means.

25. A system according to claim 13 further comprising:

means coupled to said detection means for transmitting said image data to a site remote from said composite system;

wherein said detection means includes means for selectively switching said imaging data and said calibration data to said transmission means for transmission to said remote site; and said system further comprises means for synchronizing operation of said scanning means with said switching means.

26. A method of calibrating a filter assembly employed for forming a polychromatic image of a subject, the method comprising:

producing a slit-shaped beam of solar rays;

dispersing said beam of solar rays into a set of rays dispersed according to color;

scanning rays of said subject and said dispersed rays past said filter assembly;

detecting said rays upon propagation through said filter assembly;

wherein said detecting includes a separating of data of said subject from data of said solar rays to provide an image of said subject; and said method comprising a further step of comparing data of said solar rays with reference color profile data of said filter assembly to allow for compensation of said imaging data due to drifting of a color profile of said filter assembly.

* * * * *